(12) United States Patent
Zaghib et al.

(10) Patent No.: US 10,320,029 B2
(45) Date of Patent: Jun. 11, 2019

(54) ALL-SOLID-STATE LITHIUM-SULFUR POLYMER ELECTROCHEMICAL CELLS AND PRODUCTION METHODS THEREOF

(71) Applicant: HYDRO-QUEBEC, Montréal (Québec) (CA)

(72) Inventors: Karim Zaghib, Longueuil (CA); Chisu Kim, Longueuil (CA); Abdelbast Guerfi, Brossard (CA); Francis Barray, St-Simon de Bagot (CA); Catherine Gagnon, Contrecoeur (CA); Julie Trottier, Mirabel (CA)

(73) Assignee: HYDRO-QUÉBEC, Montreal (Québec) (CA)

( * ) Notice: Subject to any disclaimer, the term of this patent is extended or adjusted under 35 U.S.C. 154(b) by 354 days.

(21) Appl. No.: 14/899,788

(22) PCT Filed: Jun. 20, 2014

(86) PCT No.: PCT/CA2014/050584
§ 371 (c)(1),
(2) Date: Dec. 18, 2015

(87) PCT Pub. No.: WO2014/201568
PCT Pub. Date: Dec. 24, 2014

(65) Prior Publication Data
US 2016/0149261 A1    May 26, 2016

(30) Foreign Application Priority Data

Jun. 21, 2013 (CA) ..................................... 2820635

(51) Int. Cl.
*H01M 10/0565* (2010.01)
*H01M 10/056* (2010.01)
(Continued)

(52) U.S. Cl.
CPC ....... *H01M 10/0565* (2013.01); *H01M 2/145* (2013.01); *H01M 2/1673* (2013.01);
(Continued)

(58) Field of Classification Search
None
See application file for complete search history.

(56) References Cited

U.S. PATENT DOCUMENTS

| | | |
|---|---|---|
| 4,739,018 A | 4/1988 | Armand et al. |
| 4,742,127 A | 5/1988 | Armand et al. |

(Continued)

FOREIGN PATENT DOCUMENTS

| | | |
|---|---|---|
| CA | 2 514 783 A1 | 8/2004 |
| CN | 102199846 A | 9/2011 |

(Continued)

OTHER PUBLICATIONS

Kim et al., Facile dry synthesis of sulfur-LiFePO4 core-shell composite for the scalable fabrication of lithium/sulfur batteries, Apr. 2013, Electrochem. Comm, 35-38.*

(Continued)

*Primary Examiner* — Daniel S Gatewood
(74) *Attorney, Agent, or Firm* — Buchanan Ingersoll & Rooney P.C.

(57) ABSTRACT

All-solid-state lithium-sulfur electrochemical cells and production methods thereof are described. The Li—S electrochemical cells comprise at least one multilayer component which comprises an ion-conductive solid electrolyte film, a positive electrode film containing a sulfur composite, and a negative electrode film containing lithium. Positive electrodes films, prefabricated electrolyte-positive electrode elements, their uses as well as methods of their production are also described.

23 Claims, 8 Drawing Sheets

(51) Int. Cl.

| | |
|---|---|
| *H01M 10/0587* | (2010.01) |
| *H01M 10/0585* | (2010.01) |
| *H01M 10/0525* | (2010.01) |
| *H01M 10/058* | (2010.01) |
| *H01M 10/0562* | (2010.01) |
| *H01M 2/14* | (2006.01) |
| *H01M 2/16* | (2006.01) |
| *H01M 4/04* | (2006.01) |
| *H01M 4/134* | (2010.01) |
| *H01M 4/136* | (2010.01) |
| *H01M 4/1397* | (2010.01) |
| *H01M 4/40* | (2006.01) |
| *H01M 4/58* | (2010.01) |
| *H01M 4/587* | (2010.01) |
| *H01M 4/62* | (2006.01) |
| *H01M 4/66* | (2006.01) |
| *H01M 4/36* | (2006.01) |
| *H01M 4/38* | (2006.01) |
| *H01M 10/0583* | (2010.01) |
| *H01M 4/02* | (2006.01) |

(52) U.S. Cl.
CPC ......... *H01M 4/0404* (2013.01); *H01M 4/134* (2013.01); *H01M 4/136* (2013.01); *H01M 4/1397* (2013.01); *H01M 4/366* (2013.01); *H01M 4/382* (2013.01); *H01M 4/405* (2013.01); *H01M 4/58* (2013.01); *H01M 4/587* (2013.01); *H01M 4/5815* (2013.01); *H01M 4/5825* (2013.01); *H01M 4/622* (2013.01); *H01M 4/625* (2013.01); *H01M 4/661* (2013.01); *H01M 4/667* (2013.01); *H01M 10/056* (2013.01); *H01M 10/058* (2013.01); *H01M 10/0525* (2013.01); *H01M 10/0562* (2013.01); *H01M 10/0583* (2013.01); *H01M 10/0585* (2013.01); *H01M 10/0587* (2013.01); *H01M 2004/027* (2013.01); *H01M 2004/028* (2013.01); *H01M 2220/20* (2013.01); *H01M 2220/30* (2013.01)

(56) References Cited

U.S. PATENT DOCUMENTS

| | | | |
|---|---|---|---|
| 4,803,249 A | 2/1989 | Armand et al. | |
| 5,528,920 A | 6/1996 | Bouchard et al. | |
| 5,910,382 A | 6/1999 | Goodenough et al. | |
| 6,517,590 B1 | 2/2003 | Gauthier et al. | |
| 7,745,048 B2 | 6/2010 | Hwang et al. | |
| 2003/0073005 A1 | 4/2003 | Kim et al. | |
| 2004/0058246 A1 | 3/2004 | Choi et al. | |
| 2004/0191617 A1 | 9/2004 | Visco et al. | |
| 2007/0111105 A1* | 5/2007 | Zaghib .................. | H01M 6/168 429/322 |
| 2009/0280410 A1 | 11/2009 | Zaguib et al. | |
| 2010/0173199 A1* | 7/2010 | Hiraki .................. | C01G 23/003 429/223 |
| 2010/0231168 A1 | 9/2010 | Kolosnitsyn et al. | |
| 2012/0094189 A1* | 4/2012 | Scrosati ............. | H01M 4/0485 429/314 |
| 2012/0207994 A1 | 8/2012 | Wang et al. | |
| 2013/0059193 A1* | 3/2013 | Scordilis-Kelley ..... | H01M 4/62 429/156 |
| 2013/0141050 A1* | 6/2013 | Visco .................... | H01M 8/188 320/130 |

FOREIGN PATENT DOCUMENTS

| | | |
|---|---|---|
| CN | 102496736 A | 6/2012 |
| JP | 2006503416 A | 1/2006 |
| JP | 2006517051 A | 7/2006 |
| JP | 2009081106 A | 4/2009 |
| JP | 2009544121 A | 12/2009 |
| KR | 20030092662 A | 12/2003 |
| WO | 97/44840 A1 | 11/1997 |
| WO | 2004/036669 A2 | 4/2004 |

OTHER PUBLICATIONS

Lion Specialty Chemicals Co., KETJENBLACK Highly Electro-Conductive Carbon Black, 1996-2017, pp. 1-3 https://www.lion-specialty-chem.co.jp/en/product/carbon/carbon01.htm.*

Hassoun J. et al. "Moving to a Solid-State Configuration: A Valid Approach to Making Lithium-Sulfur Batteries Viable for Practical Applications" Advanced Materials, vol. 22, Sep. 14, 2010, pp. 5198-52001. XP 2765765A.

Extended European Search Report (Communication) issued in corresponding application No. EP 14814630.1 dated Jan. 23, 2017 by the European Patent Office, (9 pages).

Office Action dated Jul. 28, 2017, by the Chinese Patent Office in corresponding Chinese Patent Application No. 201480034816.4, and an English Language Text of the First Office Action. (11 pages).

International Search Report (PCT/ISA/210) dated Sep. 16, 2014, by the Canada Patent Office as the International Searching Authority for International Application No. PCT/CA2014/050584.

Written Opinion (PCT/ISA/237) dated Sep. 16, 2014, by the Canada Patent Office as the International Searching Authority for International Application No. PCT/CA2014/050584.

Yan Zhao et al., "Polymer Electrolytes for Lithium/Sulfur Batteries" Review, *Membranes*, 2012, vol. 2, pp. 553-564.

Yuan Yang et al., "High-Capacity Micrometer Sized Li2S Particles As Cathode Materials for Advanced Rechargeable Lithium-Ion Batteries", J. Am. Chem. Soc., 2012, 134 (37), pp. 15387-15394.

Yuan Yang et al., "Improving the Performance of Lithium-Sulfur Batteries by Conductive-Polymer Coating", ACS Nano, 2011, 5 (11), pp. 9187-9193.

C-S. Kim et al., "Facile dru Synthesis of Sulfur-LiFeP04 Corr-Shell Composite for the Scalable Fabrication of Lithium/Sulfur Batteries", Electrochemistry Communications, vol. 32, Jul. 2013, pp. 35-38.

Sheng Zhang S. S. et al, "Liquid Electrolyte Lithium/Sulfur Battery: Fundamental Chemistry, Prolems, and Solutions" 2013, J. Power. Sources, 231, pp. 153-162.

Xiulei Ji et al., "Advances in Li—S Batteries", 2010, J. Mat. Chem., 20, pp. 9821-9826.

S.S. Jeong et al., "Electrochemical Properties of Lithium/Sulfur Cells Using Peo Polymer Electolytes Prepared Under Three Different Mixing Conditions" 2007, Journal of Power Sources, 174, pp. 745-750.

Miki Nagao et al., "All-Solid-State Li-Sulfur Batteries With Mesoporous Electrode and Thio-Lisicon Solid Electolyte", 2013, J. Power. Sources, 222, pp. 237-242.

Margaud Lecuyer et al., "Structural Changes of a Li/S Rechargeable Cell in Lithium Metal Polymer Technology", Journal of Power Sources, vol. 241, 2013, pp. 249-254.

Office Action (Notice of Reasons for Rejection) dated Feb. 19, 2018, by the Japanese Patent Office in Japanese Patent Application No. 2016-520207, and an English Translation of the Office Action. (13 pages).

* cited by examiner

ALL-SOLID-STATE LITHIUM-SULFUR POLYMER ELECTROCHEMICAL CELLS AND PRODUCTION METHODS THEREOF

RELATED APPLICATION

This application claims priority to Canadian application no. 2,820,635 filed Jun. 21, 2013, the entire teaching of which is incorporated herein by reference for all purposes.

FIELD OF THE INVENTION

The invention pertains to the field of lithium-sulfur (Li—S) electrochemical cells and to their manufacturing. More specifically, the invention pertains to all-solid state Li—S electrochemical cells, systems and units and to their manufacturing processes.

BACKGROUND OF THE INVENTION

Figure 1:
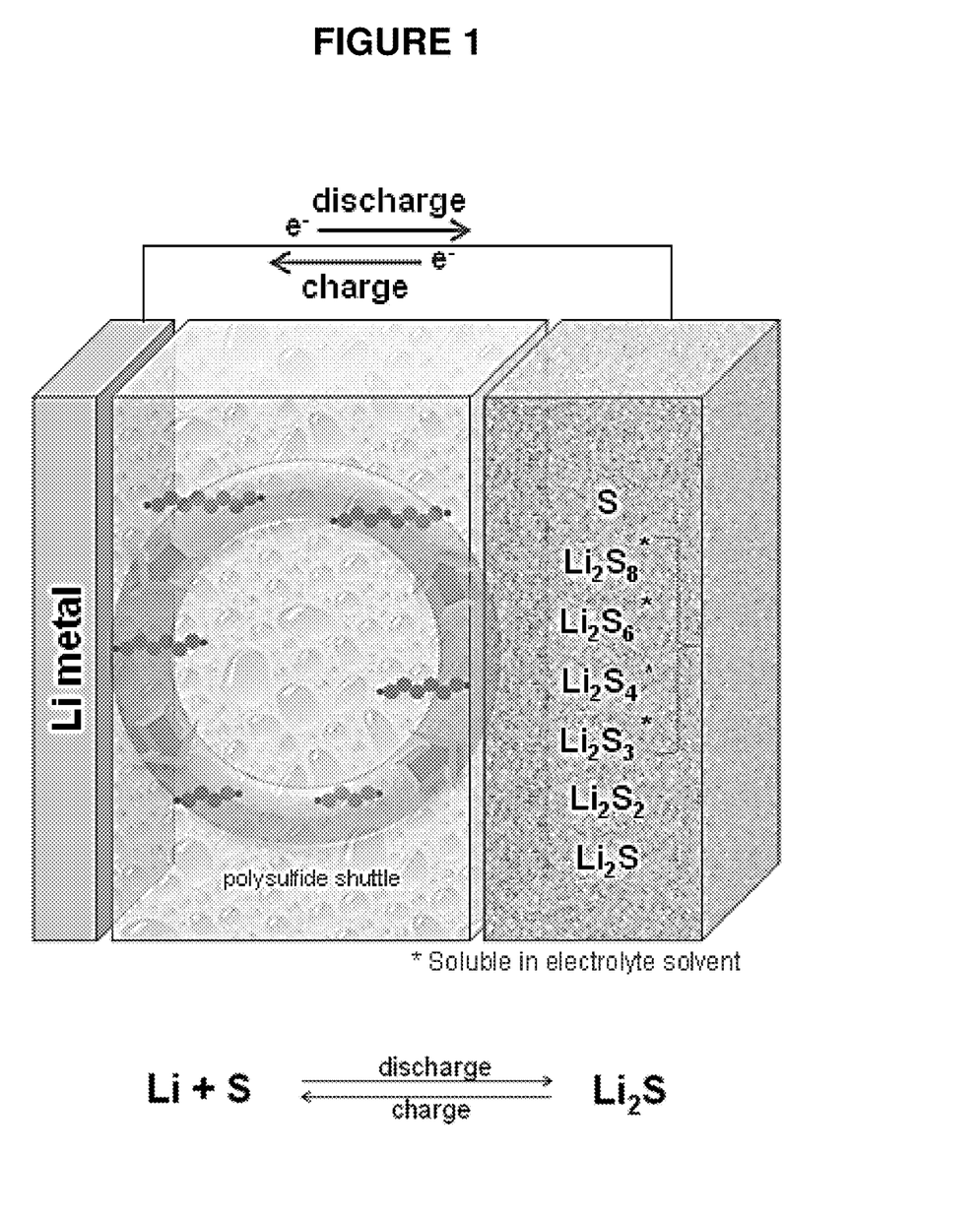
FIG. 1 illustrates the general principle of lithium-sulfur batteries in a conventional liquid electrolyte system.

A Li—S battery generally comprises a lithium metal (Li(m)) anode, a cathode containing sulfur ($S_8$) mixed with carbon (sulfur itself being a poor conductor), and a liquid electrolyte. During discharge, lithium from the anode is oxidized to form lithium ions and the sulfur is reduced in the cathode to generate Li-polysulfide species. The principle of charge-discharge reactions in a conventional liquid electrolyte is illustrated in FIG. 1.

The theoretical specific energy of lithium-sulfur (Li—S) batteries is about 3 to 5 fold higher (2567 Wh/kg) than that of Li-ion batteries. For this reason, and for its economic and environmental benefits, the Li—S battery technology is often referred to as one of the most promising Li-ion replacement technologies. However, several drawbacks have postponed its entry on the market, including poor cycle life, low cycle efficiency, severe self-discharge and questionable safety issues. This would be due to the Li-polysulfide species being, at least partly, soluble in the electrolyte, and, more fundamentally, to the insulating nature of sulfur and lithium sulfide limiting the utilization of this active material (see Zhang S. S. et al, 2013, *J. Power. Sources*, 231, pp 153-162).

Most efforts in improving the Li—S battery technology have been concentrated on modifications to the sulfur-containing composite (to trap the sulfur within the cathode, X. Ji et al, 2010, *J. Mat. Chem.*, 20, pp 9821-9826). However, most of the proposed methods involve steps which are less applicable to a larger industrial production scale and/or involve higher production costs.

Some research groups have developed polymer electrolyte systems, for example using PEO homopolymers, in order to delay the solubility of polysulfide ions, but the cell performance showed instant degradations after the initial discharge (S. S. Jeong et al., 2007, *Journal of Power Sources* 174, pp 745-750).

An all-solid-state Li—S battery was described in Nagao et al, 2013, *J. Power. Sources*, 222, pp 237-242. This system includes a mesoporous cathode composite, a Li—Al alloy anode and a thio-LISICON ($Li_{3.25}Ge_{0.25}P_{0.75}S_4$) solid electrolyte. In spite of the extraordinarily high capacity, it shows low discharge voltage and limited power performance less than 0.1 C at room temperature.

There is a need for industrially applicable Li—S electrochemical cells, having at least one of: improved cycle life, better cycle efficiency, lower self-discharge, improved safety, and/or lower production costs when compared to other Li—S battery alternatives.

SUMMARY OF THE INVENTION

According to one aspect, the invention relates to an electrochemical cell comprising at least one multilayer component which comprises: a positive electrode film comprising sulfur as an electrochemically active material; a solid electrolyte film between the negative and positive electrodes, said solid electrolyte film comprising at least one layer(s) including at least one lithium salt and at least one polymer; and a negative electrode film comprising lithium as an electrochemically active material.

In one embodiment, the solid electrolyte film is an ion-conductive film and further comprises at least one inorganic compound in the polymer-containing layer or in a separate ion-conductive solid layer.

In another embodiment, the polymer of the electrolyte consists of a block copolymer composed of at least one lithium-ion solvating segment and at least one cross-linkable segment. Preferably the lithium-ion solvating segment is selected from homo- or co-polymers having repeating units of Formula (I):

wherein,
R is selected from H, $C_1$-$C_{10}$ alkyl, or —($CH_2$—O—$R^aR^b$);
$R^a$ is ($CH_2$—$CH_2$—O)$_y$;
$R^b$ is selected from H and a $C_1$-$C_{10}$ alkyl group;
x is an integer selected from 10 to 200,000; and
y is an integer selected from 0 to 10.

In another embodiment, the cross-linkable segment of the polymer is a polymer segment comprising at least one functional group cross-linkable multi-dimensionally by irradiation or thermal treatment. The solid electrolyte may further comprise at least one lithium salt dissolved in the ion-conductive solid, preferably the lithium salt is of the formula Li+X⁻, where X⁻ is an anion with a delocalized charge, preferably an anion selected from $PF_6^-$, $BF_4^-$, $AsF_6^-$, $ClO_4^-$, $CF_3SO_3^-$, $(CF_3SO_2)_2N^-$ (TFSI), and $(C_2F_5SO_2)_2N^-$ (BETI).

In a further embodiment, the inorganic compounds of the solid electrolyte is selected from $SiO_2$, $Al_2O_3$, $TiO_2$, and other lithium-ion conductive solids, and combinations thereof, where the lithium ion conductive solid may be selected from lithium ion-conductive ceramics and glasses, such as NASICON, LISICON, thio-LISICON, Garnet, either in crystalline or amorphous phase, and combinations thereof. The lithium-ion conductive glass or ceramic preferably has a lithium-ion conductivity of at least $10^{-4}$ S/cm at 25° C. The ion conductive film has a thickness between 10 and 200 µm, between 10 and 100 µm, or between 20 and 50 µm.

According to another aspect, the invention relates to a positive electrode comprising a polymer binder. Preferably the polymer binder is a block copolymer composed of at least one lithium-ion solvating segment and at least one cross-linkable segment, wherein the lithium-ion solvating segment is selected from homo- or co-polymers having repeating units of Formula (I) as defined above. In one embodiment, the polymer binder in the positive electrode is the same as the polymer of the electrolyte. In another embodiment, the polymer binder of the positive electrode is different from the polymer of the electrolyte.

In another embodiment, the positive electrode comprises a composite material including sulfur encapsulated in a coating material, optionally manufactured by mechanofusion. Preferably, the coating material comprises an inorganic material selected from:

$Li_aM^1{}_b(XO_4)$, wherein $0 \leq a \leq 2$, $0 < b \leq 1$; $M^1$ is selected from Fe, Mn, Co, Ni, and Ti, or combinations thereof, X is selected from P, Si, and S, such as $LiFePO_4$, $LiNiPO_4$, $LiMnPO_4$, $LiCoPO_4$, or $LiFe_{1-x}Ti_xPO_4$, where $0 < x < 1$; or $Li_cM^2{}_dZ_e$, wherein $0 \leq c \leq 4$, $0 < d \leq 5$, $0 < e \leq 12$; $M^2$ is selected from Mo, V, Ti, Al, and Si; and Z is selected from O, S, and Se, such as $TiO_2$, $TiS_2$, $V_2O_5$, $LiV_3O_8$, $Li_4Ti_5O_{12}$, $MoS_2$, $MoO_2$, $SiO_2$, or $Al_2O_3$.

Optionally, the inorganic material is in the form of particles, optionally coated with carbon. In another embodiment, the positive electrode film further comprises a conductive carbon like, for example, a carbon powder or fiber selected from carbon black, activated carbon, graphite, graphene, and mixtures thereof. Preferably, the conductive carbon has a specific surface area of at least 5 $m^2/g$, or at least 50 $m^2/g$. In another embodiment, the conductive carbon has a specific surface area of at least 500 $m^2/g$.

According to another embodiment of the invention, the negative electrode film of the electrochemical cell comprises a lithium metal foil, or a lithium metal alloy, such alloy comprising at least 90% of lithium by weight. In one embodiment, the surface of the electrochemically active material of the negative electrode film further includes a passivation layer formed in situ. In another embodiment, the negative electrode film further comprises a protective layer comprising, for example, a lubricant such as a synthetic oil, where the synthetic oil may be the esterification product of a fatty acid and a polyethylene glycol. In another embodiment, the electrochemically active material of the negative electrode is a film having a thickness between about 5 μm and about 200 μm.

In another embodiment, the electrochemical cell of the invention further comprises an insulator layer adjacent to the negative electrode. In a further embodiment, the positive electrode of the electrochemical cell of the invention further comprises a current collector also acting as a support for the electrochemically active material of the positive electrode, said electrochemically active material being adjacent to the solid electrolyte. Preferably, the current collector is an aluminum foil, for example, having a thickness between about 10 μm and 30 μm, optionally including a carbon layer.

A process for the manufacturing of an electrochemical cell according to the invention, comprising the steps of:
a) providing a positive electrode film, an electrolyte film, and a negative electrode film as herein described; and
b) stacking and laminating (rolling) together the positive electrode film, electrolyte film, and negative electrode film.

In one embodiment, the step of providing a negative electrode film comprises a step of laminating the lithium foil between at least two rolls and, optionally coating the surface with a protective layer.

In another embodiment, the step of providing a positive electrode film comprises steps of mixing the electrochemically active material of the positive electrode together with conductive carbon, polymer precursors, optionally a lithium salt, an inorganic compound and/or a solvent, coating the mixture obtained on a current collector, evaporating the solvent (if necessary) and polymerizing, such as by UV irradiation or heating, to form the positive electrode film.

In another embodiment, the step of providing an electrolyte film comprises the steps of mixing polymer precursors, a lithium salt, inorganic compound(s), and optionally a solvent, to adjust the viscosity, casting of the mixture obtained on a substrate, evaporating the solvent (if necessary) and polymerizing, such as by UV irradiation or heating, to form the solid electrolyte film.

In another embodiment, the step of providing an electrolyte film comprises the steps of (a) mixing polymer precursors, lithium salt(s), and inorganic compound(s), and optionally solvent(s) to adjust the viscosity, casting of the mixture thus obtained on a substrate, evaporating the solvent (if necessary) and polymerizing, such as by UV irradiation or heating, to form a solid electrolyte film to obtain a polymer-inorganic compound film; and (b) mixing polymer precursors, lithium salt(s), and optionally solvent(s) to adjust the viscosity, casting of the mixture thus obtained on the polymer-inorganic compound film, evaporating the solvent (if necessary) and polymerizing, such as by UV irradiation or heating, to form the solid polymer electrolyte film.

In another embodiment, the step of stacking and laminating together the positive electrode, electrolyte, and negative electrode films further comprises steps of laminating the positive electrode film together with the electrolyte film and subsequently laminating the negative electrode film thereon.

In another embodiment of the invention, the electrochemical cell comprises one multilayer component which can be rolled or folded. In a further embodiment, the electrochemical cell comprises two or more stacked multilayer components.

The invention further contemplates a prefabricated electrolyte-positive electrode element comprising a sulfur-containing positive electrode comprising a composite material according to one of the embodiments of the invention; and a solid electrolyte as defined herein, wherein the positive electrode and electrolyte are stacked and laminated together.

In another embodiment, the invention provides a process for the preparation of a prefabricated electrolyte-positive electrode element of the invention, comprising the steps of: a) mixing the electrochemically active material of the positive electrode together with conductive carbon, polymer precursors, optionally lithium salt(s), inorganic material(s) and/or solvent(s); b) coating the mixture obtained in step (a) on a current collector, evaporating the solvent (if present) and polymerizing to form the positive electrode film; c) mixing of polymer precursors, lithium salt(s) and inorganic particle(s), optionally in solvent(s) and coating on a substrate to form an electrolyte film precursor; d) irradiating or heating the electrolyte film precursor of step (c) to form the solid electrolyte film; and e) stacking and laminating the positive electrode film of step (b) together with the solid electrolyte film of step (d). The process may further comprise a step of removing the substrate before or after step (e).

In a further embodiment, the process for the preparation of a prefabricated electrolyte-positive electrode element of the invention, comprises the steps of: a) mixing the electrochemically active material of the positive electrode together with conductive carbon, polymer precursors, optionally lithium salt(s), inorganic material(s) and/or solvent(s); b) coating the mixture obtained in step (a) on a current collector, evaporating the solvent (if present) and polymerizing to form a positive electrode film; c) mixing of polymer precursors, lithium salt(s) and inorganic particle(s), optionally in a solvent, and coating on the surface of the positive electrode of step (b) opposite to the current collector to produce a coated positive electrode; d) irradiating or heating the coated positive electrode obtained in step (c) to form the solid electrolyte-positive electrode element; and e) optionally laminating the composition obtained in step (d).

In yet another embodiment, the invention relates to systems comprising an electrochemical cell, a positive electrode, or a prefabricated electrolyte-positive electrode element according to the invention, and uses of a prefabricated electrolyte-positive electrode element or positive electrode in the manufacture of an electrochemical cell according to the invention. The invention also contemplates the use of the electrochemical cells of the invention in replacement of lithium-ion batteries and in systems requiring high energy rechargeable batteries, and more particularly in systems such as electric vehicles and ubiquitous IT devices.

DETAILED DESCRIPTION

The following detailed description and examples are for illustrative purposes and should not be construed as further limiting the scope of the invention.

The Li—S electrochemical cell of the invention does not contain a liquid, gel, or ceramic only electrolyte. Generally, the electrochemical cell comprises at least one multilayer component which comprises a lithium-containing negative electrode film, a sulfur-containing positive electrode film on a current collector, the negative electrode and positive electrode being separated by a solid electrolyte film comprising at least one layer, the layer containing a polymer.

Preferably, one multilayer component of the electrochemical cell has a total thickness of about 10 μm to about 1000 μm, preferably from about 100 μm to about 500 μm. An electrochemical cell comprises, for example, from 1 to 100 multilayer component(s), depending on the battery configuration. For example, an electrochemical cell can be composed of one multilayer component, which can be rolled or folded. As another example, the electrochemical cell may be composed of 2 or more multilayer components, which can be stacked together.

The polymer used in the electrolyte of this Li—S electrochemical cell includes an ion-conductive polymer to which additives are added prior to polymerization (e.g. by heating or irradiation). The use of cross-linked polymers further provides for improved conductive properties. The addition of inorganic material in the solid electrolyte, either in the form of nano-particles or a ceramic sheet, improves the mechanical strength of the electrolyte film and enhances the reversibility of the lithium metal electrode. These inorganic particles are included within the polymer-containing layer or as a separate layer of the electrolyte.

Figure 2:
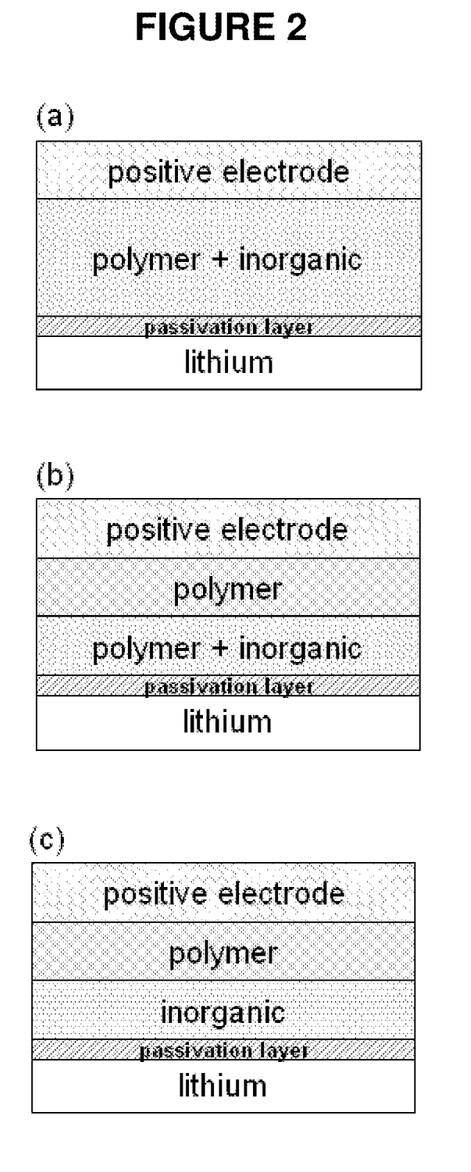
FIG. 2 illustrates examples of configurations of solid electrolyte within the electrochemical cell of the invention.
Figure 3:
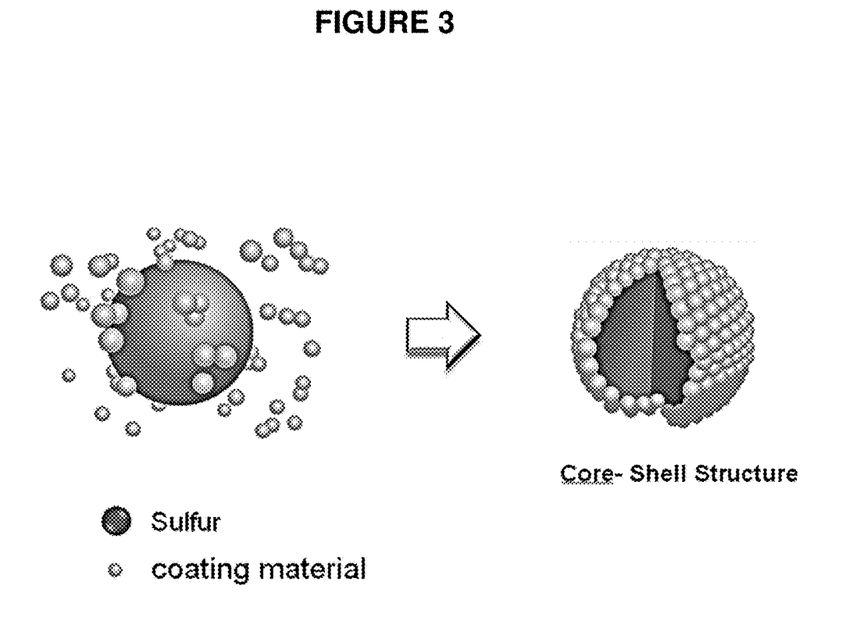
FIG. 3 schematically illustrates the sulfur composite material characterized by an inner sulfur particle encapsulated within an outer coating.

FIG. 2 illustrates examples of electrochemical cells with different configurations of the solid electrolyte according to the invention, where the lithium-containing negative electrode further includes a passivation layer.

Figure 5:
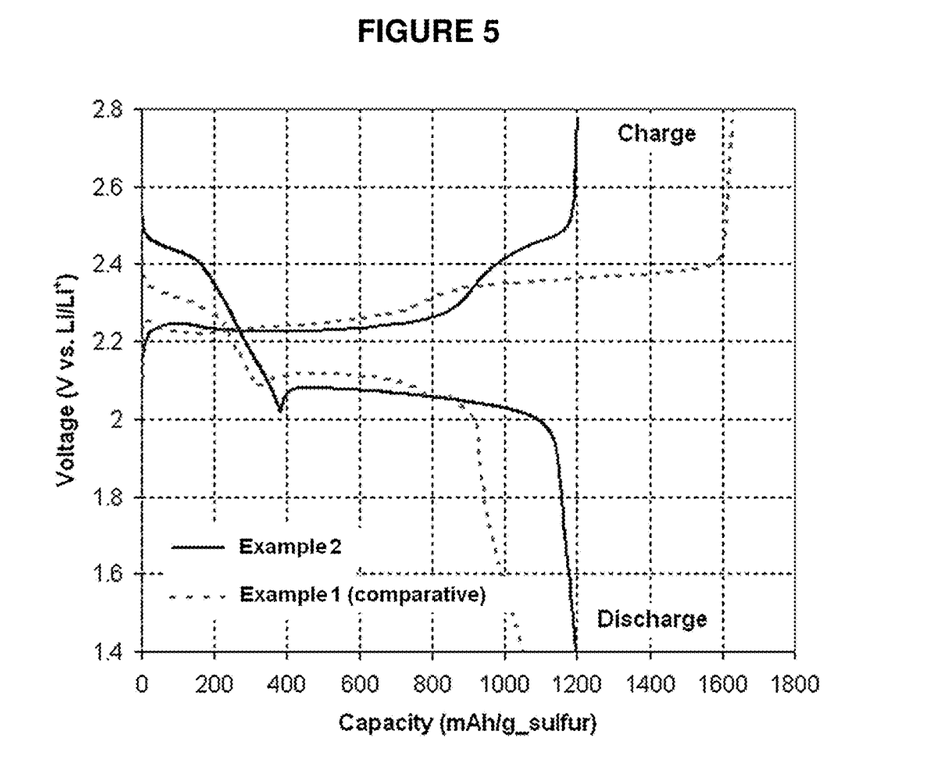
FIG. 5 shows the first discharge and charge profiles tested at 0.1 C (167 mA/g) comparing the results obtained with the electrochemical cell prepared in Example 2 and the electrochemical cell obtained in Example 1 (Comparative).

Owing to the limited solubility and thus limited mobility of polysulfide ions in the invented electrochemical system, the cell shows significantly improved coulombic efficiency, more than 90% without (or with very low) polysulfide shuttle reaction, as shown in FIG. 5.

Another aspect of the invention concerns the positive electrode which is defined in more details below. This positive electrode according to the invention contains elemental sulfur particles, an ion-conductive polymer binder and a conductive carbon additive. The sulfur particles of the positive electrode can also be further encapsulated in an inorganic conducting material prior to the application of the binder. Further additives such as lithium salts and inorganic compounds, such as glass and ceramic particles, can also be added to the positive electrode composition.

The invention also contemplates prefabricated positive electrode-electrolyte elements, as well as their preparation and use in the manufacture of electrochemical cells. These prefabricated positive electrode-electrolyte units comprise a positive electrode film and a solid electrolyte film, each as herein described.

The electrochemical cells of the invention are suitable for uses where lithium-ion batteries are generally used or in replacement thereof, and in systems demanding high energy rechargeable batteries, and more particularly in systems such as electric vehicles and ubiquitous IT devices.

The following are exemplary compositions and properties of the components of the electrochemical cell of the invention.

Solid Electrolyte

The solid electrolyte includes an ion-conductive film comprising at least one lithium salt and at least one ion-conductive polymer. The solid electrolyte may further include an inorganic compound which can be present in the polymer film or in a different film of the electrolyte.

In a preferred aspect, the polymer consists of a block copolymer composed of at least one lithium-ion solvating segment A and at least one cross-linkable segment B. Segment A is selected from homo- or co-polymers having the repeating units of Formula (I):

wherein,
R is selected from H, $C_1$-$C_{10}$ alkyl, or —(CH$_2$—O—$R^aR^b$);
$R^a$ is (CH$_2$—CH$_2$—O)$_y$;
$R^b$ is selected from H or a $C_1$-$C_{10}$ alkyl group;

x is an integer selected in the range from 10 to 200,000; and y is an integer selected in the range from 0 to 10.

Segment B is a polymer segment comprising at least one functional group cross-linkable multi-dimensionally by irradiation or thermal treatment.

Lithium salt is represented by $Li^+X^-$, in which $X^-$ is an anion with a delocalized charge, for example, an anion selected from $PF_6^-$, $BF_4^-$, $AsF_6^-$, $ClO_4^-$, $CF_3SO_3^-$, $(CF_3SO_2)_2N^-$ (TFSI), and $(C_2F_5SO_2)_2N^-$ (BETI).

Inorganic compounds in the solid electrolyte are, for example, selected from $SiO_2$, $Al_2O_3$, $TiO_2$, and other lithium ion conductive solids such as lithium ion conductive ceramics and glasses like, for example, NASICON, LISICON, thio-LISICON, Garnet, and their combinations, in crystalline and/or amorphous form.

The structure of solid electrolyte of the invention may consist of one single layer or of 2 or more layers. For example, the solid electrolyte can be selected from the 3 different configurations illustrated in FIG. 2, and summarized as follows:

a) the solid electrolyte comprises one film comprising a polymer layer containing inorganic compound particles;

b) the solid electrolyte comprises two films, a first film as defined in (a), and a second polymer film without inorganic compounds; or c) the solid electrolyte comprises two films, a first film being a polymer film, the second film comprising inorganic compounds.

In option (c), the polymer film may, optionally, further comprise an inorganic compound. The solid electrolyte film is manufactured by casting the above mentioned polymer solution on a substrate or directly on the positive electrode followed by cross-linking via UV or electron-beam irradiation or by heat treatment. The thickness of the dry film is preferably controlled between 10 μm and 100 μm, preferably between 20 μm and 50 μm. The substrate is, for example, a plastic film which can be removed before laminating the solid electrolyte film to the other elements of the electrochemical cell Positive Electrode The positive electrode of the electrochemical cell of the invention comprises at least one sulfur-containing material, preferably a sulfur-composite material comprising elemental sulfur particles, at least one conductive carbon additive, at least one polymer binder. The positive electrode material optionally further comprises at least one lithium salt and/or inorganic compound.

A sulfur-composite material may be characterized by sulfur particles having a particle size between 10 nm and 100 μm, preferably between 0.1 μm and 50 μm.

The polymer binder is added to the sulfur particles to form the positive electrode film. The polymer binder is preferably an ion-conductive polymer. In one preferred embodiment, the polymer binder is a block copolymer composed of at least one lithium-ion solvating segment A and at least one cross-linkable segment B, preferably segment A is as defined in Formula I. The polymer binder may be the same or different from the polymer in the solid electrolyte.

Additionally, a conductive carbon additive can be added to the polymer binder thereby increasing its conductivity. Examples of conductive carbon additives include carbon powders or fibers selected from carbon black, activated carbon, graphite, graphene, and mixtures thereof. For example, the specific surface area of the selected carbon is higher than 5 $m^2/g$, optionally higher than 50 $m^2/g$, or higher than 500 $m^2/g$.

According to one aspect, the sulfur particles in the polymer binder are optionally encapsulated in an outer coating layer, the coating material comprising particles of an inorganic material, optionally carbon coated, the inorganic material being selected from:

$Li_aM^1_b(XO_4)$, wherein $0 \le a \le 2$, $0 < b \le 1$, $M^1$ is selected from Fe, Mn, Co, Ni, and Ti, or a combination thereof, and X is selected from P, Si, and S, for example the coating material is selected from $LiFePO_4$, $LiNiPO_4$, $LiMnPO_4$, $LiCoPO_4$, and $LiFe_{1-x}Ti_xPO_4$, where $0 < x < 1$; or $Li_cM^2_dZ_e$, wherein $0 \le c \le 4$, $0 < d \le 5$, $0 < e \le 12$, $M^2$ is selected from Mo, V, Ti, Al, and Si, and Z is selected from O, S, and Se, for example, the coating material is $TiO_2$, $TiS_2$, $V_2O_5$, $LiV_3O_8$, $Li_4Ti_5O_{12}$, $MoS_2$, $MoO_2$, $SiO_2$, or $Al_2O_3$.

Examples of inorganic materials may also be found, for example in U.S. Pat. No. 5,910,382 (Goodenough et al), the subject of which is incorporated herein by reference in its entirety for all purposes.

One or more lithium salt(s) are optionally added to the positive electrode composite. Examples include lithium salts of $PF_6^-$, $BF_4^-$, $AsF_6^-$, $ClO_4^-$, $CF_3SO_3^-$, $(CF_3SO_2)_2N^-$ (TFSI), and $(C_2F_5SO_2)_2N^-$ (BETI) and may be the same or different from a salt present in the solid electrolyte.

Inorganic compounds are also optionally added to the positive electrode composite. Examples of inorganic compounds include $SiO_2$, $Al_2O_3$, $TiO_2$, and lithium ion conductive solids such as lithium ion-conductive ceramics and glasses, for example, NASICON, LISICON, thio-LISICON, Garnet, and their combinations, in crystalline and/or amorphous form, and may be the identical or different from an inorganic compound present in the solid electrolyte.

The current collector of the positive electrode consists of, for example, an aluminum foil, preferably having a thickness of about 10 μm to 30 μm. The current collector may also include a carbon-coating layer to promote adhesion of the current collector to the conductive carbon present in the positive electrode composite.

Negative Electrode

The negative electrode of this invention comprises lithium, either in the form of a foil of lithium metal or lithium alloy containing at least 90% of lithium by weight. According to a preferred aspect, the negative electrode comprises a lithium metal foil having a protective layer on its surface. The lithium foil has the thickness of 10 μm to 500 μm, preferably of 20 μm to 200 μm. A process for the preparation of the lithium film may be found in U.S. Pat. No. 5,528,920 (Bouchard et al.), the content of which is herein incorporated by reference in its entirety.

The protective layer is formed by coating a lubricant material on the fresh surface of a lithium foil before native oxide forms. The lubricant may be selected from the synthetic oils, more preferably from the esterification products of fatty acids and PEG (polyethylene glycol). Examples of lubricants and additives for use in the preparation of lithium films may be found in U.S. Pat. No. 6,517,590 (Gauthier et al.), the content of which is herein incorporated by reference in its entirety.

Process of Manufacturing

A process of manufacturing the electrochemical cell of the invention comprises the steps of: (a) providing a positive electrode film, a solid electrolyte film, and a negative electrode film as herein described, and (b) stacking and laminating together the positive electrode film, the solid electrolyte film, and the negative electrode film.

In one aspect, the step of providing the negative electrode film includes a step of laminating a lithium foil and coating its surface with a protective layer.

In another aspect, the step of providing the positive electrode film includes the steps of mixing the electrochemically active material of the positive electrode together with conductive carbon, polymer precursors, optionally lithium salt(s), inorganic compound(s) and/or solvent(s), coating the mixture obtained on a current collector, evaporating the solvent (if necessary) and polymerizing, by UV irradiation or heating, to form the positive electrode film.

In a further aspect, the step of providing the solid electrolyte film includes the steps of mixing polymer precursors, lithium salt(s), inorganic compound(s), and optionally solvent(s), to adjust the viscosity, casting the mixture obtained on a substrate, evaporating the solvent (if necessary) and polymerizing, by UV irradiation or heating, to form the solid electrolyte film.

Alternatively, the step of providing the solid electrolyte film includes the steps of (a) mixing polymer precursors, lithium salt(s), and inorganic compound(s), and optionally solvent(s) to adjust the viscosity, casting the mixture obtained on a substrate, evaporating the solvent (if necessary) and polymerizing, by UV irradiation or heating, to obtain a polymer-inorganic compound film; and (b) mixing polymer precursors, lithium salt(s), and optionally solvent(s) to adjust the viscosity, casting the mixture obtained on the polymer-inorganic compound film, evaporating the solvent (if necessary) and polymerizing, by UV irradiation or heating, to form the solid polymer electrolyte film.

In another aspect, the step of stacking and laminating together the positive electrode, solid electrolyte, and negative electrode films includes the steps of laminating the positive electrode film together with the solid electrolyte film and subsequently laminating the negative electrode film on the latter.

A process for the manufacturing of an electrochemical cell as illustrated in FIG. 2(a) comprising, for example, the following steps: a) laminating a lithium foil and optionally coating the surface with a protective layer as described above; b) mixing the electrochemically active material of the positive electrode together with conductive carbon, polymer precursors, and optionally lithium salt(s), inorganic compound(s) and/or solvent(s); c) coating the mixture obtained in step (b) on a current collector, evaporating the solvent (if necessary) and polymerizing by UV irradiation or heating to form the positive electrode film; d) mixing polymer precursors, lithium salt(s), inorganic compound(s), and optionally solvent(s) to adjust the viscosity; e) casting the mixture obtained in step (d) on a substrate, evaporating the solvent (if necessary) and polymerizing by UV irradiation or heating to form a solid electrolyte film; f) stacking and laminating the positive electrode film obtained in step (c), the solid electrolyte film obtained in (e), and the negative electrode film from step (a), wherein the negative and positive electrode films are each in contact with an opposite surface of the solid electrolyte film. The process may further include a step of removing the substrate from the solid electrolyte film before step (f).

According to another aspect, the process for the manufacturing of the electrochemical cell of the invention comprising the following steps: a) laminating a lithium foil and optionally coating the surface with a protective layer as described above; b) mixing the electrochemically active material of the positive electrode together with conductive carbon, polymer precursors, and optionally lithium salt(s), inorganic compound(s) and/or solvent(s); c) coating the mixture obtained in step (b) on a current collector and evaporating the solvent (if necessary) to form a positive electrode film precursor; d) mixing polymer precursors, lithium salt(s), inorganic compound(s), and optionally solvent(s) to adjust the viscosity; e) casting the mixture obtained in step (d) on the positive electrode film precursor of step (c), evaporating the solvent (if necessary) and polymerizing, by UV irradiation or heating, to form a positive electrode/solid electrolyte film; f) stacking and laminating the positive electrode/solid electrolyte film obtained in step (e), and the negative electrode film from step (a), where the negative and positive electrode films are respectively in contact with an opposite surface of the solid electrolyte film.

A process for the manufacturing of an electrochemical cell illustrated in FIG. 2(b) comprises the following steps: a) laminating a lithium foil and optionally coating the surface with a protective layer as described above; b) mixing the electrochemically active material of the positive electrode together with conductive carbon, polymer precursors, and optionally lithium salt(s), inorganic compound(s) and/or solvent(s); c) coating the mixture obtained in step (b) on a current collector, evaporating the solvent (if necessary) and polymerizing, by UV irradiation or heating, to form a positive electrode film; d) mixing polymer precursors, lithium salt(s), and optionally solvent(s) to adjust viscosity; e) casting the mixture obtained in step (d) on a substrate, evaporating the solvent (if necessary) and polymerizing, by UV irradiation or heating, to form a first solid electrolyte film; f) mixing polymer precursors, lithium salt(s), inorganic compound(s) and optionally solvent(s) to adjust viscosity; g) casting the mixture obtained in step (f) on a substrate, evaporating the solvent (if necessary) and polymerizing, by UV irradiation or heating, to form a second solid electrolyte film; h) stacking and laminating the positive electrode film obtained in step (c), the first solid electrolyte film obtained in (e), the second solid electrolyte film obtained in (g), and the negative electrode film from step (a), wherein the positive and negative electrode films are facing the first solid electrolyte film and the second solid electrolyte film, respectively. The process may further include a step of removing the substrate(s) of one or both solid electrolyte films before step (h).

According to another aspect, the process for the manufacturing of the electrochemical cell of the invention comprising the following steps: a) laminating a lithium foil and optionally coating the surface with a protective layer as described above; b) mixing the electrochemically active material of the positive electrode together with conductive carbon, polymer precursors, and optionally lithium salt(s), inorganic compound(s) and/or solvent(s); c) coating the mixture obtained in step (b) on a current collector and evaporating the solvent (if necessary) to form a positive electrode film precursor; d) mixing polymer precursors, lithium salt(s), and optionally solvent(s) to adjust viscosity; e) casting the mixture obtained in step (d) on the positive electrode film precursor obtained in (c), evaporating the solvent (if necessary) and polymerizing, by UV irradiation or heating, form a film "positive electrode/first solid electrolyte film"; f) mixing polymer precursors, lithium salt(s), inorganic compound(s), and optionally solvent(s) to adjust viscosity; g) casting the mixture obtained in step (f) on a substrate, evaporating the solvent (if necessary) and polymerizing, by UV irradiation or heating, to form a second solid electrolyte film; h) stacking and laminating the film "positive electrode/first solid electrolyte film" obtained in step (e), the second solid electrolyte film obtained in (g) and the negative electrode film from step (a), where the second solid electrolyte film faces the free surface of the first solid electrolyte film, opposite to the positive electrode film, the negative electrode film facing the second solid electrolyte film on the opposite side from the first solid electrolyte film. The process may further include a step of removing the substrate from the second electrolyte film before step (h).

According to another aspect, the process for the manufacturing of the electrochemical cell of the invention comprising the following steps: a) laminating a lithium foil and optionally coating the surface with a protective layer as described above; b) mixing the electrochemically active material of the positive electrode together with conductive carbon, polymer precursors, and optionally lithium salt(s), inorganic compound(s) and/or solvent(s); c) coating the mixture obtained in step (b) on a current collector and evaporating the solvent (if necessary) to form a positive electrode film precursor; d) mixing polymer precursors, lithium salt(s), and optionally solvent(s) to adjust viscosity; e) casting the mixture obtained in step (d) on the positive electrode film precursor of step (c), evaporating the solvent (if necessary); f) mixing polymer precursors, lithium salt, inorganic compounds, and optionally a solvent to adjust viscosity; g) casting the mixture obtained in step (f) on the "electrolyte" surface of the film obtained in (e), evaporating the solvent (if necessary) and polymerizing, by UV irradiation or heating, to form a positive electrode/solid electrolyte film where the solid electrolyte film comprises two layers; h) stacking and laminating the positive electrode/solid electrolyte film obtained in step (g), and the negative electrode film from step (a), wherein the negative and positive electrode films are each in contact with an opposite surface of the solid electrolyte film.

A process for the manufacturing of an electrochemical cell as illustrated in FIG. 2(c) is carried out similarly to the above, further comprising a step of preparing and adding an inorganic layer between the solid electrolyte film and the negative electrode film. For example, the inorganic layer is prepared by pressing inorganic powders to form a pellet or sheet and by heating at a temperature of 500° C.-1000° C. The pellet or sheet of inorganic powder preferably has a thickness of about 10 μm to about 1000 μm, preferably 50-500 μm. The inorganic layer may also be deposited by cathode sputtering.

EXAMPLES

Example 1 (Comparative)

a) Preparation of Positive Electrode Film

Poly(ethylene oxide) homo-polymer (PEO) (MW 5,000,000) was dissolved in a mixture of acetonitrile and toluene (8:2 volume ratio) at a concentration of 10 wt % to afford a PEO solution. Sulfur powder (3.00 g), Ketjen™ black (1.00 g), and the PEO solution (4.49 g) were mixed using a planetary centrifugal mixer (Thinky Mixer ARE-250™). Additional solvent (acetonitrile+toluene by 8:2 in volume ratio) was added to the slurry to reach the appropriate viscosity of ~10,000 cP for coating. The slurry thus obtained was coated on a carbon-coated aluminum foil using a doctor blade of 100 μm gap.

b) Cell Assembly

CR2032-type coin cells were assembled in a helium-filled glove box using a Celgard 3501™ separator and a lithium foil (Hoshen, 200 μm) anode. Next, 0.12 ml of 1 M lithium bis(trifluoromethanesulfonyl)imide (LiTFSI) in a mixture of ethylene glycol dimethyl ether (DME) and 1,3-dioxolane (DOX) (1:1 by volume ratio) was injected into the cell. The first charge (0.1 C) and discharge (0.1 C) curves of Example 1 (Comparative) are demonstrated in FIG. 5.

Example 2 a) Preparation of the Sulfur-Composite Material

Figure 4:
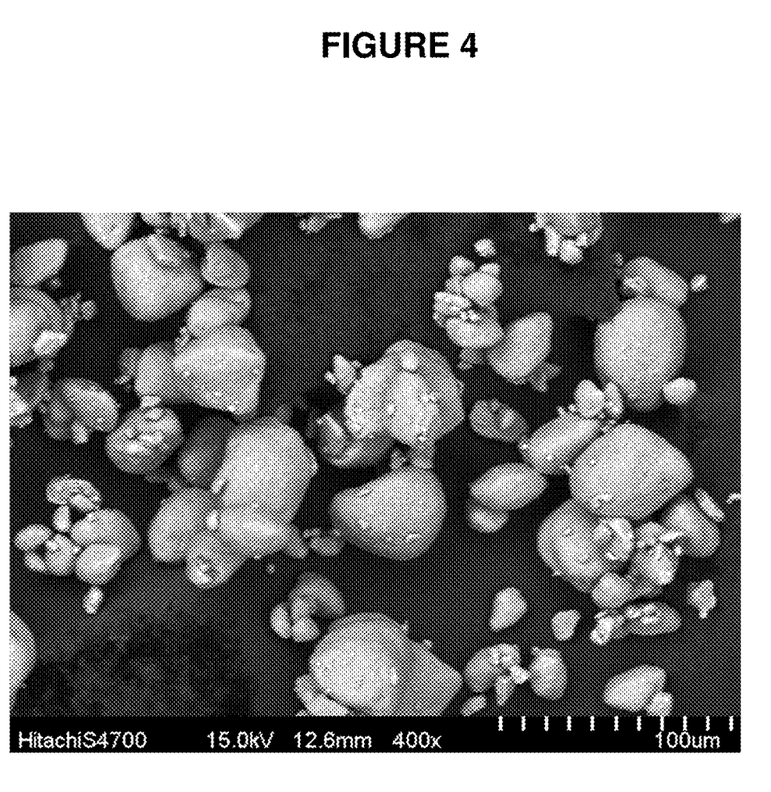
FIG. 4 shows an SEM image of sulfur-LiFePO$_4$ composite, where sulfur particles are encapsulated within a LiFePO$_4$ layer.

Pre-dried sulfur powder (20 g) and carbon-coated LiFePO$_4$ (avg. 100 nm, 5 g) were processed in a Nobilta™ powder mixer (NOB-MINI™, Hosokawa Micron Corp.) at 5000 rpm for 5 minutes. The SEM image of the sulfur-composite thus obtained is presented in FIG. 4.

b) Preparation of the Positive Electrode Film

Cross-linkable poly(ethylene oxide) polymer was dissolved in a mixture of acetonitrile and toluene (8:2 volume ratio) at a concentration of 28.75 wt % ("polymer solution" hereafter). Sulfur-composite (9.79 g) from step (a), Ketjen™ Black (4.88 g), the polymer solution (17.0 g), and solvents (acetonitrile:toluene, 8:2 volume ratio; 99.2 g) were ball-milled for 24 hours in an alumina jar filled with alumina balls. LiClO$_4$ (0.44 g) and 2,2-dimethoxy-1,2-diphenylethan-1-one (0.06 g) were then added and the mixture was further ball-milled for 30 minutes. The obtained slurry was coated on a carbon-coated aluminum foil using a doctor blade. After drying the solvent at 60° C. for 10 minutes, the film was irradiated with UV light in a N$_2$ purged atmosphere for 2 minutes.

c) Preparation of the Solid Polymer Electrolyte Film

Silica (4.46 g) was added to the polymer solution (94.57 g) and ball-milled for 24 hours. Then, LiClO$_4$ (5.05 g) and 2,2-dimethoxy-1,2-diphenylethan-1-one (0.12 g) were added to the solution and the mixture further ball-milled for 30 minutes. To make a film, the solution was casted on a polypropylene substrate and, after removing the solvent at 60° C. for 10 minutes, the film was irradiated with UV light in a nitrogen purged atmosphere for 2 minutes. The film's thickness was measured as 25 μm after drying.

As an alternative process, the polymer solution was casted on the positive electrode film and cross-linked under the same conditions.

d) Cell Assembly

The cell was assembled by stacking and laminating the 3 films: positive electrode, solid polymer electrolyte and lithium foil (40 μm) under a 30 psi pressure at 80° C. After connecting the terminal to the electrodes, the cell was sealed in an air-tight plastic bag. The cell performance of the example is demonstrated in FIG. 5.

Example 3 a) Preparation of the Positive Electrode Film

Sulfur-composite (2.438 g) from Example 2(a), carbon black (0.993 g, Super P® from Timcal Graphite and Carbon), the polymer solution from Example 2(a) (4.391 g), and solvents (acetonitrile:toluene, 8:2 volume ratio; 26.08 g) were mixed using a planetary centrifugal mixer (Thinky Mixer ARE-250™). LiTFSI (0.298 g) and 2,2-dimethoxy-1,2-diphenylethan-1-one (0.015 g) were then added and the mixture was mixed for 4 minutes. The obtained slurry was coated on a carbon-coated aluminum foil using a doctor blade. After drying the solvent at 60° C. for 10 minutes, the film was irradiated with UV light in a N$_2$ purged atmosphere for 2 minutes.

b) Preparation of the Solid Polymer Electrolyte Film $SiO_2$ (0.799 g) was added to the polymer solution (20.00 g) and ball-milled for 24 hours. Then, LiTFSI (1.205 g) and 2,2-dimethoxy-1,2-diphenylethan-1-one (0.022 g) were added to the solution and mixed using a planetary centrifugal mixer for 2 min. To make a film, the solution was casted on a polypropylene substrate and, after removing the solvent at 60° C. for 10 minutes, the film was irradiated with UV light in a nitrogen purged atmosphere for 2 minutes. The film's thickness was measured as 25 μm after drying.

As an alternative process, the polymer solution was casted on the positive electrode film and cross-linked under the same condition.

c) Cell Assembly

Figure 6:
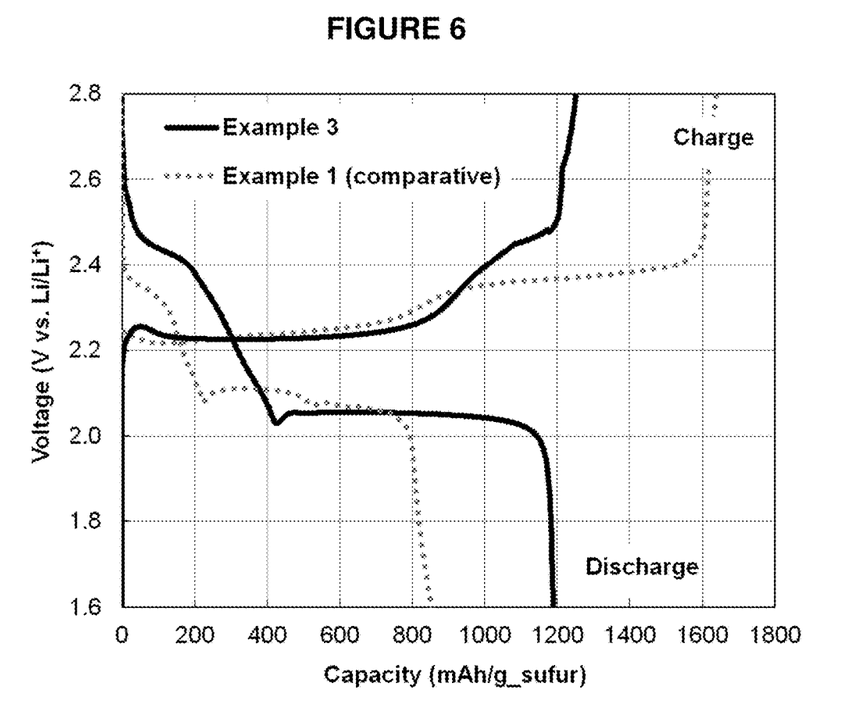
FIG. 6 shows the third discharge and charge profiles of the cell illustrated in Example 3 in comparison with those of the cell in Example 1 (Comparative).

The cell was assembled by stacking and laminating the 3 films: positive electrode, solid polymer electrolyte and lithium foil (40 μm) at 80° C. After connecting the terminal to the electrodes, the cell was sealed in an air-tight package. The third charge (0.1 C) and discharge (0.1 C) curves are demonstrated in FIG. 6 in comparison of those of the cell in Example 1. The consecutive cycle behavior is presented in FIG. 6.

Example 4 a) Preparation of the Positive Electrode Film

Sulfur-composite (2.529 g) from Example 2(a), Super P® (1.01 g), $SiO_2$ (0.165 g), the polymer solution (3.969 g), and solvents (acetonitrile:toluene, 8:2 volume ratio; 28.04 g) were mixed using a planetary centrifugal mixer. LiTFSI (0.244 g) and 2,2-dimethoxy-1,2-diphenylethan-1-one (0.016 g) were then added and the mixture was mixed for 4 minutes. The obtained slurry was coated on a carbon-coated aluminum foil using a doctor blade. After drying the solvent at 60° C. for 10 minutes, the film was irradiated with UV light in a $N_2$ purged atmosphere for 2 minutes.

b) Preparation of the Solid Polymer Electrolyte Film $SiO_2$ (0.799 g) was added to the polymer solution (20.00 g) and ball-milled for 24 hours. Then, LiTFSI (1.205 g) and 2,2-dimethoxy-1,2-diphenylethan-1-one (0.022 g) were added to the solution and mixed using a planetary centrifugal mixer for 2 min. To make a film, the solution was casted on a polypropylene substrate and, after removing the solvent at 60° C. for 10 minutes, the film was irradiated with UV light under a nitrogen purged atmosphere for 2 minutes. The film's thickness was measured as 25 μm after drying.

As an alternative process, the solution was casted on the positive electrode film and the polymer was cross-linked under the same condition.

c) Preparation of Negative Electrode Film

A lubricant solution is prepared by dissolving PEO200 distearate (6.6 g, molecular weight of PEO unit: approximately 200) in toluene (100 mL) and adding hexane (900 mL). A lithium sheet with a thickness of 300 μm is laminated between two rolls to make a lithium film with a thickness of 30 μm while injecting the lubricant solution onto the foil.

d) Cell Assembly

Figure 7:
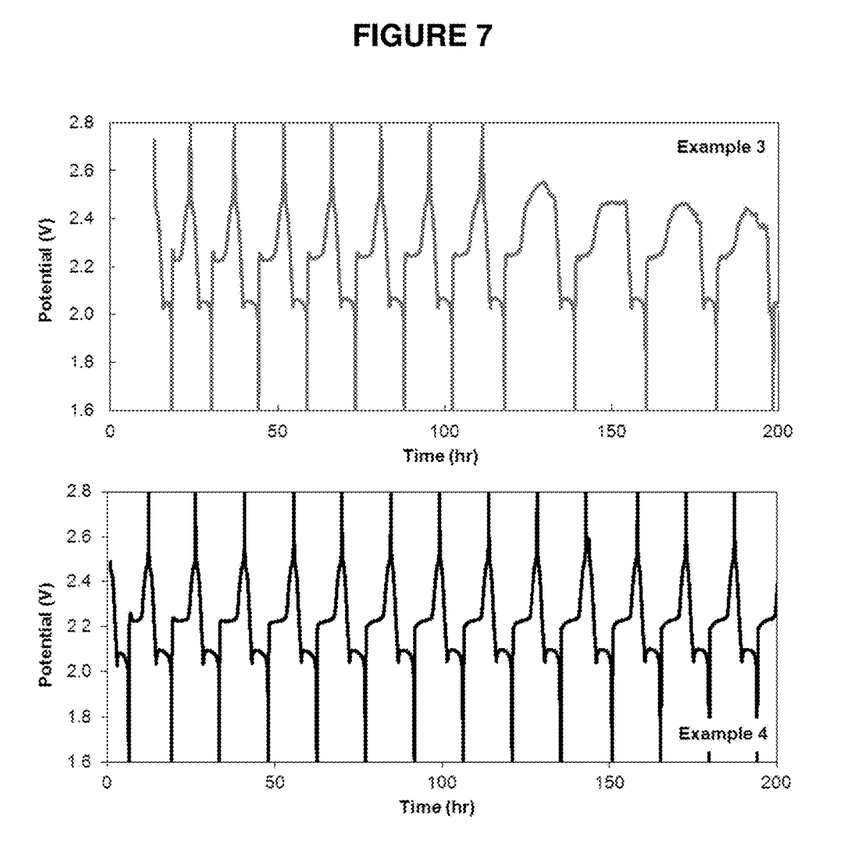
FIG. 7 shows the cycling performance of the cells prepared in Examples 3 and 4 respectively.

The cell was assembled by stacking and laminating the 3 films: positive electrode, solid polymer electrolyte and negative electrode at 80° C. After connecting the terminal to the electrodes, the cell was sealed in an air-tight package. The cycle performance is compared with that of Example 3 in FIG. 7.

Example 5

An electrochemical cell is prepared as in Example 4, in which the sulfur-composite material is prepared using $TiS_2$ instead of C—$LiFePO_4$. Other conditions are the same as for Example 4.

Example 6

Figure 8:
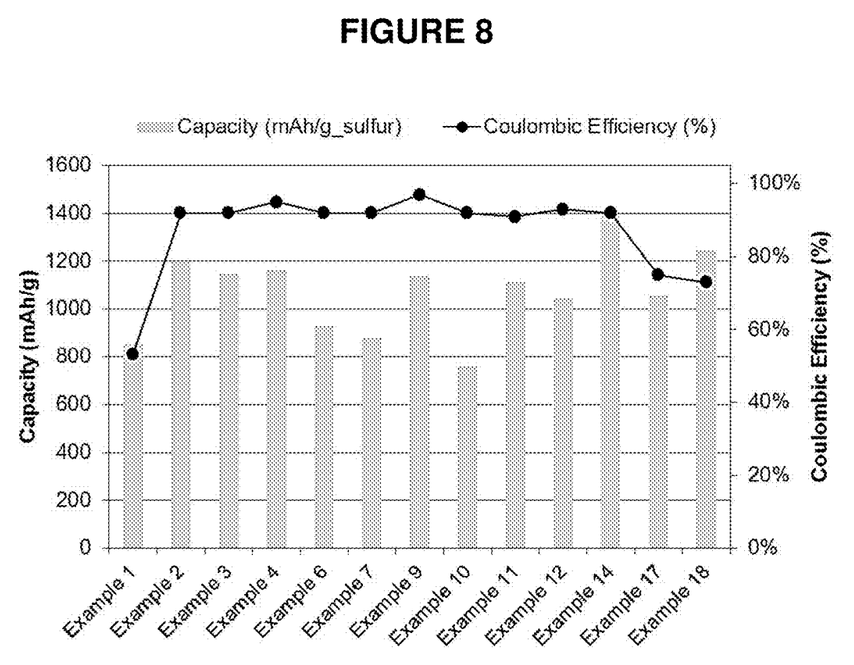
FIG. 8 shows the summary of initial capacity and coulombic efficiency of the cells prepared in Examples 1 (Comparative), 2 to 4, 6, 7, 9 to 12, 14, 17 and 18 (Comparative).

An electrochemical cell was prepared as in Example 4, in which the sulfur-composite material was prepared using $TiO_2$ instead of C—$LiFePO_4$. Other conditions were the same as for Example 4. The initial discharge capacity at 0.1 C and its coulombic efficiency are demonstrated in FIG. 8.

Example 7

An electrochemical cell was prepared as in Example 4, in which the sulfur-composite material was prepared using $MoS_2$ instead of C—$LiFePO_4$. Other conditions were the same as for Example 4. The initial discharge capacity at 0.1 C and its coulombic efficiency are demonstrated in FIG. 8.

Example 8

An electrochemical cell is prepared as in Example 4, in which the sulfur-composite material is prepared using $MoO_2$ instead of C—$LiFePO_4$. Other conditions are the same as for Example 4.

Example 9

An electrochemical cell was prepared as in Example 4, in which the sulfur-composite material was prepared using $LiV_3O_5$ instead of C—$LiFePO_4$. Other conditions were the same as for Example 4. The initial discharge capacity at 0.1 C and its coulombic efficiency are demonstrated in FIG. 8.

Example 10

An electrochemical cell was prepared as in Example 4, in which the sulfur-composite material was prepared using $V_2O_5$ instead of C—$LiFePO_4$. Other conditions were the same as for Example 4. The initial discharge capacity at 0.1 C and its coulombic efficiency are demonstrated in FIG. 8.

Example 11

An electrochemical cell was prepared as in Example 4, in which the sulfur-composite material was prepared using $Li_4Ti_5O_{12}$ instead of C—$LiFePO_4$. Other conditions were the same as for Example 4. The initial discharge capacity at 0.1 C and its coulombic efficiency are demonstrated in FIG. 8.

Example 12

An electrochemical cell was prepared as in Example 4, in which the sulfur-composite material was prepared using $SiO_2$ instead of C—$LiFePO_4$. Other conditions were the same as for Example 4. The initial discharge capacity at 0.1 C and its coulombic efficiency are demonstrated in FIG. 8.

Example 13

An electrochemical cell is prepared as in Example 4, in which the sulfur-composite material is prepared using $Al_2O_3$ instead of $C—LiFePO_4$. Other conditions are the same as for Example 4.

Example 14

An electrochemical cell was prepared as in Example 4, in which the solid electrolyte was prepared by stacking an OHARA glass film (thickness 150 μm) and the polymer electrolyte film of Example 4 to obtain a structure as shown in FIG. 2(c). Other conditions were the same as in Example 4. The discharge capacity at 0.02 C and its coulombic efficiency are demonstrated in FIG. 8.

Example 15

An electrochemical cell is prepared as in Example 4, in which the solid electrolyte is prepared using $Li_6La_3ZrTaO_{12}$ instead of $SiO_2$. Other conditions are the same as for Example 4.

Example 16

An electrochemical cell is prepared as in Example 4, in which the solid electrolyte is prepared using $Al_2O_3$ instead of $SiO_2$. Other conditions are the same as for Example 4.

Example 17

An electrochemical cell was prepared as in Example 4, in which the solid electrolyte was prepared using $TiO_2$ instead of $SiO_2$. Other conditions were the same as for Example 4. The discharge capacity at 0.1 C and its coulombic efficiency are demonstrated in FIG. 8.

Example 18 (Comparative)

An electrochemical cell was prepared as in Example 4, in which pristine sulfur powder was used instead of the sulfur-composite material of Example 4. Other conditions were the same as for Example 4. The discharge capacity at 0.1 C and its coulombic efficiency are demonstrated in FIG. 8.

The invention claimed is:

1. An electrochemical cell comprising at least one multilayer component which comprises:
    a positive electrode film comprising, on a current collector, elemental sulfur particles as an electrochemically active material, conductive carbon, and a polymer binder, the elemental sulfur particles being encapsulated in an inorganic coating material, said inorganic coating material comprising an inorganic material selected from:
        $Li_aM^1{}_b(XO_4)$, wherein $0 \leq a \leq 2$, $0 < b \leq 1$; $M^1$ is selected from Fe, Mn, Co, Ni, and Ti, or combinations thereof, and X is selected from P, Si and S;
        $Li_cM^2{}_dZ_e$, wherein $0 \leq c \leq 4$, $0 < d \leq 5$, $0 < e \leq 12$, $M^2$ is selected from Mo, V, Ti, Al, and Si, and Z is O; and
        $Li_cM^2{}_dZ_e$, wherein $1 \leq c \leq 4$, $0 < d \leq 5$, $0 < e \leq 12$, $M^2$ is selected from Mo, V, Ti, Al, and Si, and Z is selected from S and Se;
    a negative electrode film comprising lithium as an electrochemically active material; and
    a solid electrolyte film between the negative and positive electrode films, said solid electrolyte film comprising at least one lithium salt and at least one polymeric layer, wherein the solid electrolyte film is an ion-conductive film and further comprises at least one electrolyte inorganic compound in the polymeric layer or in a separate ion-conductive solid layer, the polymeric layer comprising a block copolymer composed of at least one lithium-ion solvating segment and at least one cross-linkable segment, the cross-linkable segment being a polymer segment comprising at least one functional group cross-linkable multi-dimensionally by irradiation or thermal treatment, and the lithium-ion solvating segment being selected from homo- and copolymers having repeating units of formula (I):

wherein,
    R is selected from H, $C_1$-$C_{10}$ alkyl, or —($CH_2$—O—$R^aR^b$);
    $R^a$ is ($CH_2$—$CH_2$—O)$_y$;
    $R^b$ is selected from H and a $C_1$-$C_{10}$ alkyl group;
    x is an integer selected from the range of 10 to 200,000; and
    y is an integer selected from the range of 0 to 10.

2. The electrochemical cell according to claim 1, wherein the electrolyte inorganic compound in the solid electrolyte film is selected from $SiO_2$, $Al_2O_3$, $TiO_2$, lithium ion-conductive glasses or ceramics, and other lithium ion-conductive solids, and combinations thereof.

3. The electrochemical cell according to claim 2, wherein the lithium ion-conductive glasses or ceramics are selected from NASICON, LISICON, thio-LISICON, Garnet, either in crystalline or amorphous form, and combinations thereof.

4. The electrochemical cell according to claim 1, wherein the solid electrolyte film has a thickness between 10 and 200 μm.

5. The electrochemical cell according to claim 1, wherein the polymer binder is a block copolymer composed of at least one lithium ion-solvating segment and at least one cross-linkable segment.

6. The electrochemical cell according to claim 5, wherein the lithium ion-solvating segment is selected from homo- or copolymers having repeating units of Formula (I):

wherein,
    R is selected from H, $C_1$-$C_{10}$ alkyl, or —($CH_2$—O—$R^aR^b$);
    $R^a$ is ($CH_2$—$CH_2$—O)$_y$;
    $R^b$ is selected from H and a $C_1$-$C_{10}$ alkyl group;
    x is an integer selected from the range of 10 to 200,000; and
    y is an integer selected from the range of 0 to 10.

7. The electrochemical cell according to claim 1, wherein the inorganic material is in the form of particles, optionally coated with carbon.

8. The electrochemical cell according to claim 1, wherein the inorganic material is selected from $LiFePO_4$, $LiNiPO_4$, $LiMnPO_4$, $LiCoPO_4$, and $LiFe_{1-x}Ti_xPO_4$, where $0 < x < 1$.

9. The electrochemical cell according to claim 1, wherein the inorganic material is selected from $TiO_2$, $V_2O_5$, $LiV_3O_8$, $Li_4Ti_5O_{12}$, $MoO_2$, $SiO_2$, and $Al_2O_3$.

10. The electrochemical cell according to claim 1, wherein the positive electrode film comprises a composite material including sulfur encapsulated in a coating material and the composite material is prepared by mechanofusion.

11. The electrochemical cell according to claim 1, wherein the conductive carbon is a carbon powder or fiber selected from carbon black, activated carbon, graphite, graphene, and mixtures thereof.

12. The electrochemical cell according to claim 11, wherein the conductive carbon has a specific surface area of at least 5 $m^2/g$.

13. The electrochemical cell according to claim 1, wherein the electrochemically active material of the negative electrode film comprises a lithium metal foil or a lithium metal alloy comprising at least 90% by weight of lithium.

14. The electrochemical cell according to claim 13, wherein a surface of the electrochemically active material of the negative electrode film further includes a passivation layer formed in situ.

15. The electrochemical cell according to claim 13, wherein the negative electrode film further comprises a protective layer.

16. A method for the manufacturing of an electrochemical cell as defined in claim 1, comprising the following steps:
   a) providing the positive electrode film, the electrolyte film, and the negative electrode film; and
   b) stacking and laminating together the positive electrode, electrolyte, and negative electrode films between at least two rollers;
      wherein the step of providing the positive electrode film comprises the steps of mixing the electrochemically active material of the positive electrode together with a conductive carbon, polymer precursors, and optionally lithium salt(s), inorganic compound(s) and/or solvent(s), coating the mixture obtained on a current collector, evaporating the solvent (if present) and polymerizing, by UV irradiation or thermal treatment, to form the positive electrode film.

17. The method according to claim 16, wherein the step of providing the electrolyte film comprises the steps of mixing polymer precursors, lithium salt(s), optionally inorganic compound(s) and/or solvent(s) to adjust viscosity, casting the mixture obtained on a substrate, evaporating the solvent (if present) and polymerizing, by UV irradiation or thermal treatment, to form the solid electrolyte film.

18. The process according to claim 16, wherein the step of providing the electrolyte film comprises the steps of (i) mixing polymer precursors, lithium salt(s), inorganic compound(s), and optionally solvent(s) to adjust the viscosity, casting the mixture obtained on a substrate, evaporating the solvent (if present) and polymerizing, by UV irradiation or thermal treatment, to form the solid electrolyte film, thus obtaining a polymer-inorganic compound film; and (ii) mixing polymer precursors, lithium salt(s), and optionally solvent(s) to adjust the viscosity, casting the mixture obtained on the polymer-inorganic compound film, evaporating the solvent (if necessary) and polymerizing, by UV irradiation or thermal treatment, to form the solid electrolyte film.

19. The method according to claim 16, wherein step (b) comprises laminating the positive electrode film together with the solid electrolyte film and subsequently laminating the negative electrode film thereon.

20. A positive electrode film comprising, on a current collector, elemental sulfur particles as an electrochemically active material, a polymer binder and a conductive carbon, the elemental sulfur particles being encapsulated in an inorganic coating material, said inorganic coating material comprising an inorganic material selected from:
   $Li_aM^1_b(XO_4)$, wherein $0 \leq a \leq 2$, $0 < b \leq 1$; $M^1$ is selected from Fe, Mn, Co, Ni, and Ti, or combinations thereof, and X is selected from P, Si and S;
   $Li_cM^2_dZ_e$, wherein $0 \leq c \leq 4$, $0 < d \leq 5$, $0 < e \leq 12$, $M^2$ is selected from Mo, V, Ti, Al, and Si, and Z is O; and
   $Li_cM^2_dZ_e$, wherein $1 \leq c \leq 4$, $0 < d \leq 5$, $0 < e \leq 12$, $M^2$ is selected from Mo, V, Ti, Al, and Si, and Z is selected from S and Se;
   wherein the polymer binder is a block copolymer composed of at least one lithium ion-solvating segment and at least one cross-linkable segment,
   wherein the lithium ion-solvating segment is selected from homo- or copolymers having repeating units of Formula (I):

wherein,
   R is selected from H, $C_1$-$C_{10}$ alkyl, or —($CH_2$—O—$R^aR^b$);
   $R^a$ is ($CH_2$—$CH_2$—O)$_y$;
   $R^b$ is selected from H and a $C_1$-$C_{10}$ alkyl group;
   x is an integer selected from the range of 10 to 200,000; and
   y is an integer selected from the range of 0 to 10.

21. A prefabricated electrolyte-positive electrode element comprising:
   a positive electrode film as defined in claim 20; and
   a solid electrolyte film at least one lithium salt and at least one polymeric layer, wherein the solid electrolyte film is an ion-conductive film and further comprises at least one electrolyte inorganic compound in the polymeric layer or in a separate ion-conductive solid layer;
   wherein the positive electrode and solid electrolyte films are stacked and laminated.

22. A method for the preparation of a prefabricated electrolyte-positive electrode element as defined in claim 21, comprising the steps of:
   a) mixing sulfur together with conductive carbon, polymer precursors, and optionally lithium salt(s), inorganic compound(s), and/or solvent(s);
   b) coating the mixture obtained in step (a) on a current collector, evaporating the solvent (if present) and polymerizing to form the positive electrode film;
   c) mixing polymer precursors, lithium salt(s) and inorganic compound(s) in a solvent or solvents and coating on a substrate to form an electrolyte film precursor;
   d) irradiating or heating the electrolyte film precursor of step (c) to form the solid electrolyte film; and
   e) stacking and laminating the positive electrode film of step (b) together with the solid electrolyte film of step (d) to produce the prefabricated electrolyte-positive electrode element.

23. A method for the preparation of a prefabricated electrolyte-positive electrode element as defined in claim 21, comprising the steps of:

a) mixing sulfur together with conductive carbon, polymer precursors, and optionally lithium salt(s), inorganic compound(s), and/or solvent(s);
b) coating the mixture obtained in step (a) on a current collector and evaporating the solvent (if present) to form a positive electrode film precursor;
c) mixing polymer precursors, lithium salt(s), inorganic compound(s) and optionally solvent(s), and coating on a surface of the positive electrode film precursor of step (b) to produce an electrolyte film/positive electrode film precursor;
d) irradiating or heating the electrolyte film/positive electrode film precursor obtained in step (c) to form the prefabricated electrolyte-positive electrode element.

* * * * *